United States Patent
Lee et al.

(10) Patent No.: US 10,644,323 B2
(45) Date of Patent: May 5, 2020

(54) METAL MESH FOIL FOR CURRENT COLLECTOR OF LITHIUM SECONDARY BATTERY, ELECTRODE FOR LITHIUM SECONDARY BATTERY AND LITHIUM SECONDARY BATTERY COMPRISING THE SAME

(71) Applicant: LG Chem, Ltd., Seoul (KR)

(72) Inventors: Su Min Lee, Daejeon (KR); Sun Young Shin, Daejeon (KR); Oh Byong Chae, Daejeon (KR); Eun Kyung Kim, Daejeon (KR)

(73) Assignee: LG Chem, Ltd. (KR)

( * ) Notice: Subject to any disclaimer, the term of this patent is extended or adjusted under 35 U.S.C. 154(b) by 121 days.

(21) Appl. No.: 15/271,392

(22) Filed: Sep. 21, 2016

(65) Prior Publication Data

US 2017/0092956 A1 Mar. 30, 2017

(30) Foreign Application Priority Data

Sep. 21, 2015 (KR) .................. 10-2015-0133393
Sep. 20, 2016 (KR) .................. 10-2016-0120148

(51) Int. Cl.
| | | |
|---|---|---|
| *H01M 4/66* | (2006.01) | |
| *H01M 4/74* | (2006.01) | |
| *H01M 10/0525* | (2010.01) | |
| *H01M 4/02* | (2006.01) | |
| *H01M 4/86* | (2006.01) | |

(52) U.S. Cl.
CPC ............. *H01M 4/74* (2013.01); *H01M 4/661* (2013.01); *H01M 4/667* (2013.01); *H01M 10/0525* (2013.01); *H01M 2004/027* (2013.01); *H01M 2004/8684* (2013.01)

(58) Field of Classification Search
CPC ......... H01M 4/74; H01M 4/661; H01M 4/667
See application file for complete search history.

(56) References Cited

U.S. PATENT DOCUMENTS

| | | | | |
|---|---|---|---|---|
| 2008/0138701 A1* | 6/2008 | Kuboki | ................... | H01M 2/08 |
| | | | | 429/129 |
| 2008/0280169 A1* | 11/2008 | Niu | ......................... | H01B 1/04 |
| | | | | 429/409 |

FOREIGN PATENT DOCUMENTS

| | | |
|---|---|---|
| JP | 2013191391 A | 9/2013 |
| KR | 20080025434 A | 3/2008 |

* cited by examiner

*Primary Examiner* — Ula C Ruddock
*Assistant Examiner* — Frank A Chernow
(74) *Attorney, Agent, or Firm* — Lerner, David, Littenberg, Krumholz & Mentlik, LLP

(57) ABSTRACT

Provided is a metal mesh foil for a current collector of a lithium secondary battery having a hydrophobic deposition layer formed on a surface thereof, wherein the hydrophobic deposition layer is a deposition layer, in which a hydrophobic material is deposited, and has a thickness of 1 Å to 100 Å.

14 Claims, 2 Drawing Sheets

(a)

(b)

100

(a)

(b)

METAL MESH FOIL FOR CURRENT COLLECTOR OF LITHIUM SECONDARY BATTERY, ELECTRODE FOR LITHIUM SECONDARY BATTERY AND LITHIUM SECONDARY BATTERY COMPRISING THE SAME

TECHNICAL FIELD

Cross-Reference to Related Applications

This application claims the benefit of Korean Patent Application Nos. 10-2015-133393, filed on Sep. 21, 2015, and 10-2016-0120148, filed on Sep. 20, 2016, in the Korean Intellectual Property Office, the disclosure of which is incorporated herein in its entirety by reference.

Technical Field

The present invention relates to a metal mesh foil for a current collector of a lithium secondary battery, and an electrode for a lithium secondary battery and a lithium secondary battery comprising the metal mesh foil, and more particularly, to a metal mesh foil hydrophobically modified by a hydrophobic deposition layer formed on a surface thereof, and an electrode for a lithium secondary battery and a lithium secondary battery comprising the metal mesh foil.

BACKGROUND ART

Demand for secondary batteries as an energy source has been significantly increased as technology development and demand with respect to mobile devices have increased. Among these secondary batteries, lithium secondary batteries having high energy density, high operating potential, long cycle life, and low self-discharging rate have been commercialized and widely used.

A lithium secondary battery is generally composed of a positive electrode comprising a positive electrode active material, a negative electrode comprising a negative electrode active material, a separator, and an electrolyte, and is a secondary battery in which charge and discharge is performed by intercalation-deintercalation of lithium ions. Since lithium secondary batteries may have high energy density, large electromotive force, and high capacity, the lithium secondary batteries are used in various areas.

Metal foil, such as aluminum and copper, are respectively coated with the positive electrode active material and the negative electrode active material, and the positive electrode and the negative electrode of the lithium secondary battery may then be prepared by rolling the coated metal foils. However, with respect to an electrode plate subjected to a post processing after a current collector, such as a aluminum foil or copper foil, is coated with an active material, since a phenomenon may occur in which the active material is exfoliated from the metal foil, swelling may occur and output characteristics and lifetime characteristics may be reduced.

As a measure to overcome the limitations, there have been attempts to prevent the above-described exfoliation phenomenon by processing the metal foil into a mesh and coating the mesh-processed metal foil with the active material.

However, with respect to the mesh-processed metal foil, there have been process problems in which, when the mesh-processed metal foil is coated with a slurry comprising the active material, the slurry flows down through the mesh.

Thus, there is a need to develop a new technique which may address the above-described process problems while using the mesh-processed metal foil as a current collector of the lithium secondary battery.

DISCLOSURE OF THE INVENTION

Technical Problem

An aspect of the present invention provides a metal mesh foil for a lithium secondary battery which may address limitations, such as flowing down of a slurry which may occur during the coating of the metal mesh foil with the slurry in the processing of a lithium secondary battery, by hydrophobically modifying the metal mesh foil through the formation of a hydrophobic deposition layer on the surface of the metal mesh foil.

Another aspect of the present invention provides a current collector for a lithium secondary battery which includes the metal mesh foil for a current collector of a lithium secondary battery, and an electrode for a lithium secondary battery comprising the current collector.

Another aspect of the present invention provides a lithium secondary battery comprising the electrode for a lithium secondary battery.

Technical Solution

According to an aspect of the present invention, there is provided a metal mesh foil for a current collector of a lithium secondary battery having a hydrophobic deposition layer formed on a surface thereof, wherein the hydrophobic deposition layer is a deposition layer, in which a hydrophobic material is deposited, and has a thickness of 1 Å to 100 Å.

According to another aspect of the present invention, there is provided a current collector for a lithium secondary battery comprising the metal mesh foil for a current collector of a lithium secondary battery and an electrode for a lithium secondary battery comprising the current collector for a lithium secondary battery.

According to another aspect of the present invention, there is provided a lithium secondary battery comprising the electrode for a lithium secondary battery.

Advantageous Effects

Since a metal mesh foil for a current collector of a lithium secondary battery of the present invention may address limitations, such as flowing down of a slurry which may occur during the coating of the metal mesh foil with the slurry in the processing of a lithium secondary battery, by hydrophobically modifying the metal mesh foil through the formation of a hydrophobic deposition layer on the surface of the metal mesh foil, the metal mesh foil may be suitable for the preparation of the lithium secondary battery and a lithium secondary battery comprising the metal mesh foil may have a good performance in term of swelling problem, output characteristics, and lifetime characteristics.

MODE FOR CARRYING OUT THE INVENTION

Figure 1:
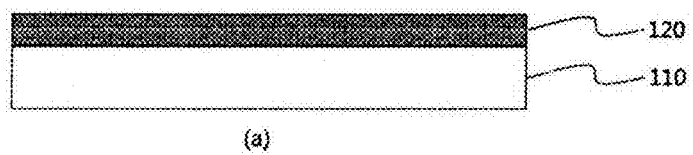
FIG. 1 is a schematic view illustrating a cross section of a metal mesh foil for a current collector of a lithium secondary battery according to an embodiment of the present invention.
Figure 1:
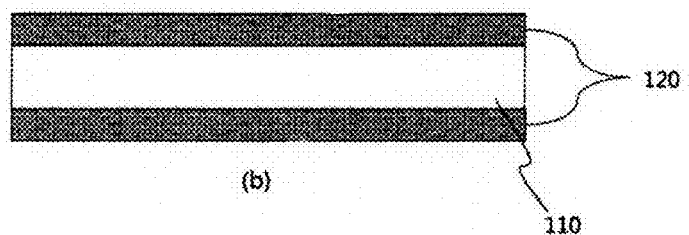

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A metal mesh foil for a current collector of a lithium secondary battery of the present invention is a metal mesh foil having a hydrophobic deposition layer formed on a surface thereof, wherein the hydrophobic deposition layer is a deposition layer, in which a hydrophobic material is deposited, and has a thickness of 1 Å to 100 Å.

The metal mesh foil may be one, in which microscopic irregularities are formed on a metal foil, the surface thereof is formed in the shape of a mesh screen, or a plurality of holes are punched into a metal foil, and specifically, may be one in which a plurality of holes are punched into a metal foil. In the specification of the present invention, the metal foil may have a shape of a film, a sheet, a foil, a net, a porous body, a foam body, or a non-woven fabric body.

In a metal mesh foil for a current collector of a lithium secondary battery according to an embodiment of the present invention, the hydrophobic material may be an organic silane-based compound, and specific examples of the organic silane-based compound may be at least one selected from the group consisting of triethoxy vinylsilane, dimethyl ethoxy vinylsilane, 3-mercaptopropyl trimethoxysilane, trimethoxy fluorosilane, and trichloro(1H,1H,2H,2H-perfluorooctyl)silane. Also, specifically, the hydrophobic material may be trichloro(1H,1H,2H,2H-perfluorooctyl)silane.

The deposition layer may be formed by being deposited in a single layer or multilayers by a method such as chemical vapor deposition (CVD).

The deposition layer may have a thickness of 1 Å to 100 Å, particularly 1 Å to 50 Å or 10 Å to 50 Å, and more particularly 10 Å to 30 Å.

In a case in which the deposition layer has a thickness of 1 Å or more, the surface of the metal mesh foil may be modified to be appropriately hydrophobic, and, in a case in which the deposition layer has a thickness of 100 Å or less, that a resistance value of the metal mesh foil, on which the deposition layer is formed, is excessively increased due to an increase in resistance of the deposition layer may be prevented.

Specifically, in a case in which the hydrophobic deposition layer is formed on the metal mesh foil, the metal mesh foil may be smoothly modified to be hydrophobic as the thickness is increased, but, since electrochemical properties of a lithium secondary battery and an electrode for a lithium secondary battery comprising the metal mesh foil may be deteriorated due to the increased in the resistance value of the metal mesh foil on which the deposition layer is formed, there is a need to appropriately adjust the thickness of the hydrophobic deposition layer. In a case in which the hydrophobic deposition layer is deposited as thin as possible within a thickness range of less than the appropriate range, it is advantageous in that it may reduce the increased in the resistance value of the metal mesh foil on which the deposition layer is formed, but, in a case in which the thickness is less than 1 Å, a degree, in which the surface of the metal mesh foil is modified to be hydrophobic, is insignificant. The reason for this is considered that, in a case in which the thickness of the hydrophobic deposition layer is excessively small, portions corresponding to defects initially generated in the process of depositing the hydrophobic material are not hydrophobically modified while the portions remain intact as the portions are not filled with the hydrophobic material subsequently deposited. Thus, in order to appropriately maintain the resistance value while providing hydrophobic properties to the metal mesh foil, there is a need for the thickness of the hydrophobic deposition layer to satisfy the above range.

The metal mesh foil for a current collector of a lithium secondary battery is modified to be hydrophobic by the hydrophobic deposition layer, and thus, the metal mesh foil for a current collector of a lithium secondary battery may have a water contact angle of 80° to 130°, particularly 100° to 130° or 105° to 125°, and more particularly 105° to 110°.

In a case in which the water contact angle of the metal mesh foil for a current collector of a lithium secondary battery is 80° or more, when a slurry is coated on the metal mesh foil by using the metal mesh foil for a current collector of a lithium secondary battery as a current collector, since high affinity may be obtained by interaction with the slurry due to the appropriate hydrophobicity, flowing down of the slurry may be prevented. In a case in which the water contact angle is 130° or less, that the resistance is excessively increased due to an excessive increase in the thickness of the hydrophobic deposition layer for obtaining a higher water contact angle may be prevented.

Thus, the metal mesh foil having the hydrophobic deposition layer formed on the surface thereof may have a resistance value of 105% to 130%, particularly 105% to 120%, and more particularly 105% to 110% based on the metal mesh foil on which the hydrophobic deposition layer is not formed.

The resistance value of the metal mesh foil for a current collector of a lithium secondary battery may be in a range of 0.9 mΩ·cm² to 1.3 mΩ·cm², particularly 1 mΩ·cm² to 1.22 mΩ·cm² or 1.05 mΩ·cm² to 1.22 mΩ·cm², and more particularly 1.05 mΩ·cm² to 1.13 mΩ·cm².

The current collector of the lithium secondary battery may be used as a current collector for a positive electrode or a current collector for a negative electrode without particular limitation, but specifically, may be a current collector for a negative electrode of the lithium secondary battery.

The metal mesh foil is not particularly limited as long as it is a metal mesh foil used as a negative electrode collector of the lithium secondary battery, specific examples of the metal mesh foil may be thin mesh foil of copper, gold, stainless steel, aluminum, nickel, titanium, fired carbon; copper or stainless steel that is surface-treated with one of carbon, nickel, titanium, or silver; or an aluminum-cadmium alloy, and the metal mesh foil, for example, may be a copper mesh foil.

The thickness of the metal mesh foil may be in a range of 3 μm to 500 μm.

Hereinafter, the metal mesh foil for a current collector of a lithium secondary battery of the present invention will be described in more detail with reference to the accompanying drawings, but the drawings are merely presented to exemplify the present invention and the scope of the present invention is not limited thereto. In the drawings of the present invention, the size of each element may be exaggerated for convenience of description and clarity, and thus, the size of each element may not entirely reflect an actual size.

Figure 2:
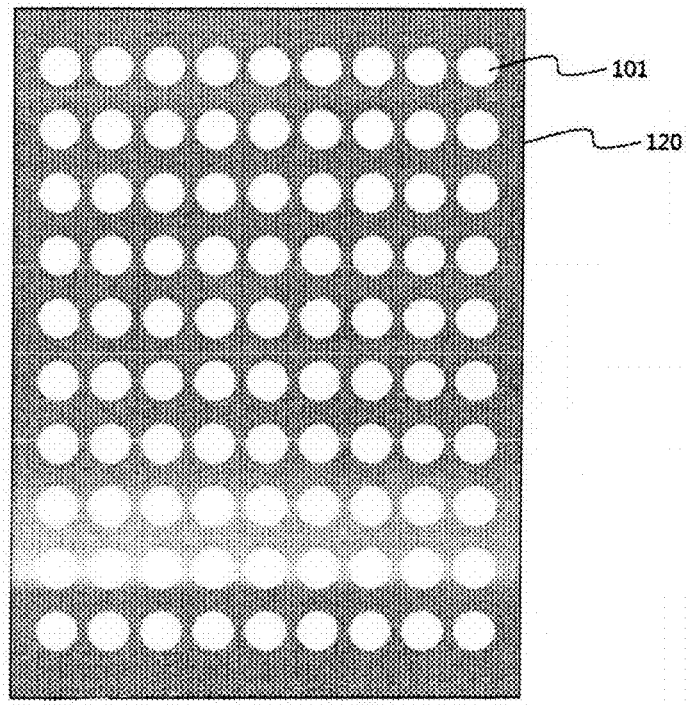
FIG. 2 is a schematic plan view illustrating the metal mesh foil for a current collector of a lithium secondary battery according to the embodiment of the present invention.

A cross section of the metal mesh foil for a current collector of a lithium secondary battery according to the embodiment of the present invention is schematically illustrated in FIG. 1, and a schematic plan view of the metal mesh foil for a current collector of a lithium secondary battery according to the embodiment of the present invention is illustrated in FIG. 2.

Referring to FIG. 1, with respect to a metal mesh foil 100 for a current collector of a lithium secondary battery according to the embodiment of the present invention, a hydrophobic deposition layer 120 is formed on a metal mesh foil 110, that is, on one surface (see (a) of FIG. 1) or both surfaces (see (b) of FIG. 1) of the metal mesh foil 110.

Referring to FIG. 2, when the metal mesh foil 100 for a current collector of a lithium secondary battery according to the embodiment of the present invention is viewed from the top, a mesh 101 of the metal mesh foil 100 for a current collector of a lithium secondary battery may be in the form of a hole which is punched into the metal mesh foil (see 110 of FIG. 1). Since the hydrophobic deposition layer 120 is formed on the surface of the metal mesh foil (see 110 of FIG. 1) to cover the surface excluding the mesh 101, the hydrophobic deposition layer 120 may have affinity with a slurry during coating to prevent limitations that the slurry flows down into a space of the mesh 101.

The metal mesh foil for a current collector of a lithium secondary battery according to the present invention is suitable for the current collector of the lithium secondary battery, and thus, the present invention provides a current collector for a lithium secondary battery comprising the metal mesh foil for a current collector of a lithium secondary battery and also provides an electrode for a lithium secondary battery comprising the current collector for a lithium secondary battery.

The current collector for a lithium secondary battery may be a current collector for a negative electrode of the lithium secondary battery, and thus, the electrode for a lithium secondary battery may be a negative electrode.

Also, the present invention provides a lithium secondary battery comprising the electrode for a lithium secondary battery.

The lithium secondary battery may include a positive electrode, a negative electrode, and a separator disposed between the positive electrode and the negative electrode.

The positive electrode may be prepared by a typical method known in the art. For example, a binder, a conductive agent, and a dispersant, if necessary, as well as a solvent are mixed with a positive electrode active material and stirred to prepare a slurry, and a metal current collector is then coated with the slurry and pressed. Thereafter, the positive electrode may be prepared by drying the coated metal current collector.

Any metal may be used as the metal current collector so long as it is a metal having high conductivity as well as not causing adverse chemical changes in the battery in a voltage range of the battery to which the slurry of the positive electrode active material may be easily adhered, and, for example, stainless steel, aluminum, nickel, titanium, fired carbon, or aluminum or stainless steel that is surface-treated with one of carbon, nickel, titanium, silver, or the like may be used. Also, the current collector may have an uneven surface to improve the bonding strength of the positive electrode active material. The current collector may be used in various shapes, such as that of a film, a sheet, a foil, a net, a porous body, a foam body, a non-woven fabric body, and the like, and may have a thickness of 3 μm to 500 μm.

Examples of the positive electrode active material may be a layered compound, such as lithium cobalt oxide ($LiCoO_2$); lithium nickel oxide ($LiNiO_2$); $Li[Ni_aCo_bMn_cM^1_d]O_2$ (where $M^1$ is any one selected from the group consisting of aluminum (Al), gallium (Ga), and indium (In), or two or more elements thereof, and $0.3 \le a < 0.1$, $0 \le b \le 0.5$, $0 \le c \le 0.5$, $0 \le d \le 0.1$, and $a+b+c+d=1$); $Li(Li_eM^2_{f-e-f}M^3_{f'})O_{2-g}A_g$ (where $0 \le e \le 0.2$, $0.6 \le f \le 1$, $0 \le f' \le 0.2$, and $0 \le g \le 0.2$, $M^2$ comprises manganese (Mn) and at least one selected from the group consisting of nickel (Ni), cobalt (Co), iron (Fe), chromium (Cr), vanadium (V), copper (Cu), zinc (Zn), and titanium (Ti), $M^3$ is at least one selected from the group consisting of Al, magnesium (Mg), and boron (B), and A is at least one selected from the group consisting of phosphorous (P), fluorine (F), sulfur (S), and nitrogen (N)), or a compound substituted with at least one transition metal; lithium manganese oxides such as $Li_{1+h}Mn_{2-h}O_4$ (where $0 \le h \le 0.33$), $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; Ni-site type lithium nickel oxide represented by the chemical formula $LiNi_{1-y}M^4_yO_2$ (where $M^4$ is Co, Mn, Al, Cu, Fe, Mg, B, or Ga, and $0.01 \le y \le 0.3$); lithium manganese complex oxide represented by the chemical formula $LiMn_{2-y}M^5_yO_2$ (where $M^5$ is Co, Ni, Fe, Cr, Zn, or tantalum (Ta), and $0.01 \le y \le 0.1$) or $Li_2Mn_3M^6O_8$ (where $M^6$ is Fe, Co, Ni, Cu, or Zn); $LiMn_2O_4$ having a part of lithium (Li) being substituted with alkaline earth metal ions; a disulfide compound; $LiFe_3O_4$, and $Fe_2(MoO_4)_3$. However, the positive electrode active material is not limited thereto.

An organic solvent, such as N-methylpyrrolidone (NMP), dimethylformamide (DMF), acetone, and dimethylacetamide, or water, may be used as the solvent for forming the positive electrode. These solvents may be used alone or in a mixture of two or more thereof. An amount of the solvent used may be sufficient if the solvent may dissolve and disperse the positive electrode active material, the binder, and the conductive agent in consideration of a coating thickness of the slurry and manufacturing yield.

Various types of binder polymers, such as a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, poly (acrylic acid), polymers in which hydrogens thereof are substituted with Li, sodium (Na), or calcium (Ca), or various copolymers, may be used as the binder.

Any conductive agent may be used without particular limitation so long as it has suitable conductivity without causing adverse chemical changes in the battery. For example, the conductive agent may include a conductive material such as: graphite such as natural graphite or artificial graphite; carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives. The conductive agent may be used in an amount of 1 wt % to 20 wt % based on a total weight of the positive electrode slurry.

An aqueous dispersant or an organic dispersant, such as N-methyl-2-pyrrolidone, may be used as the dispersant.

The negative electrode may be prepared by a typical method known in the art. For example, additives, such as a binder, a conductive agent, and a thickener, are selectively mixed with a negative electrode active material and stirred to prepare a negative electrode active material slurry, and the current collector for a lithium secondary battery may then be coated with the slurry, dried, and pressed to prepare the negative electrode.

A carbon material, lithium metal, silicon, or tin, which may intercalate and deintercalate lithium ions, may be typically used as the negative electrode active material that is used in the negative electrode. For example, the carbon material may be used and both low crystalline carbon and high crystalline carbon may be used as the carbon material. Typical examples of the low crystalline carbon may be soft carbon and hard carbon, and typical examples of the high crystalline carbon may be natural graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The binder may be used for maintaining a molded article by binding negative electrode active material particles, wherein the binder is not particularly limited as long as it is typically used in the preparation of the slurry for a negative electrode active material, but, for example, as a non-aqueous binder, polyvinyl alcohol, carboxymethyl cellulose, hydroxypropyl cellulose, diacetylene cellulose, polyvinyl chloride, polyvinylpyrrolidone, polytetrafluoroethylene (PTFE), polyvinylidene fluoride (PVdF), polyethylene, or polypropylene may be used, and, as a aqueous binder, any one selected from the group consisting of an acrylonitrile-butadiene rubber, a styrene-butadiene rubber, and an acryl rubber or a mixture of two or more thereof may be used. Since the aqueous binder, different from the non-aqueous binder, may be economical and environmentally friendly, may not be harmful to the health of workers, and may have binding effect larger than that of the non-aqueous binder, a ratio of the active material for the same volume may be increased. Thus, the capacity of the lithium secondary battery may be increased, and a styrene-butadiene rubber may be used as the aqueous binder.

The binder may be included in an amount of 10 wt % or less based on a total weight of the slurry for a negative electrode active material, and may be specifically included in an amount of 0.1 wt % to 10 wt %. In a case in which the amount of the binder is less than 0.1 wt %, it is not desirable because an effect due to the use of the binder is insignificant, and, in a case in which the amount of the binder is greater than 10 wt %, it is not desirable because capacity per volume may be reduced due to a decrease in the relative amount of the active material according to the increase in the amount of the binder.

Any conductive agent may be used without particular limitation so long as it has suitable conductivity without causing adverse chemical changes in the battery, and examples of the conductive agent may be a conductive material such as: graphite such as natural graphite or artificial graphite; carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives. The conductive agent may be used in an amount of 1 wt % to 9 wt % based on the total weight of the slurry for a negative electrode active material.

Any thickener may be used as the above thickener as long as it is typically used in the lithium secondary battery, and, for example, the thickener may be carboxymethyl cellulose (CMC).

Also, a typical porous polymer film used as a typical separator, for example, a porous polymer film prepared from a polyolefin-based polymer, such as an ethylene homopolymer, propylene homopolymer, an ethylene-butene copolymer, an ethylene-hexene copolymer, and an ethylene-methacrylate copolymer, may be used alone or in a lamination therewith as the separator. Furthermore, a typical porous nonwoven fabric, for example, a nonwoven fabric formed of high melting point glass fibers or polyethylene terephthalate fibers may be used, but the present invention is not limited thereto.

A lithium salt, which may be included as the electrolyte used in the present invention, may be used without limitation so long as it is typically used in an electrolyte for a lithium secondary battery. For example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $-CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

The electrolyte used in the present invention may include an organic liquid electrolyte, an inorganic liquid electrolyte, a solid polymer electrolyte, a gel-type polymer electrolyte, a solid inorganic electrolyte, and a molten inorganic electrolyte which may be used in the preparation of the lithium secondary battery, but the present invention is not limited thereto.

A shape of the lithium secondary battery of the present invention is not particularly limited, and for example, a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module comprising a plurality of battery cells.

Preferred examples of the medium and large sized device may be an electric vehicle, a hybrid electric vehicle, a plug-in hybrid electric vehicle, or a power storage system, but the medium and large sized device is not limited thereto.

EXAMPLES

Hereinafter, the present invention will be described in more detail, according to examples and experimental example, but the present invention is not limited thereto. The invention may be embodied in many different forms and should not be construed as being limited to the embodiments set forth herein. Rather, these example embodiments are provided so that this description will be thorough and complete, and will fully convey the scope of the present invention to those skilled in the art.

Example 1

A 50 μm thick copper mesh foil (100 mesh, wire diameter 50 μm) having a plurality of holes punched in a surface thereof and 2 μl of trichloro(1H,1H,2H,2H-perfluorooctyl)silane were put in a vacuum dryer (Jeio Tech, Co. Ltd.) and heated in a vacuum state at a temperature of 90° C. for 60 minutes to prepare a metal mesh foil on which a hydrophobic deposition layer of trichloro(1H,1H,2H,2H-perfluorooctyl)silane was formed. In this case, a thickness of the hydrophobic deposition layer was about 30 Å.

Example 2

A metal mesh foil, in which a hydrophobic deposition layer of trichloro(1H,1H,2H,2H-perfluorooctyl)silane was formed on a surface of a copper mesh foil, was prepared in the same manner as in Example 1 except that an amount of the trichloro(1H,1H,2H,2H-perfluorooctyl)silane was set to 0.8 μl in Example 1. A thickness of the hydrophobic deposition layer was about 10 Å.

Example 3

A metal mesh foil, in which a hydrophobic deposition layer of trichloro(1H,1H,2H,2H-perfluorooctyl)silane was formed on a surface of a copper mesh foil, was prepared in the same manner as in Example 1 except that an amount of the trichloro(1H,1H,2H,2H-perfluorooctyl)silane was set to 4.5 μl in Example 1. A thickness of the hydrophobic deposition layer was about 50 Å.

Example 4

A metal mesh foil, in which a hydrophobic deposition layer of trichloro(1H,1H,2H,2H-perfluorooctyl)silane was formed on a surface of a copper mesh foil, was prepared in the same manner as in Example 1 except that an amount of the trichloro(1H,1H,2H,2H-perfluorooctyl)silane was set to 10 μl in Example 1. A thickness of the hydrophobic deposition layer was about 100 Å.

Comparative Example 1

A 50 μm thick copper mesh foil (100 mesh, wire diameter 50 μm) having a plurality of holes punched in a surface thereof was used as it is without further processing.

Comparative Example 2

A metal mesh foil was prepared in the same manner as in Example 1 by forming a hydrophobic deposition layer on the copper mesh foil except that 11 μl of trichloro(1H,1H,2H,2H-perfluorooctyl)silane was used in Example 1. A thickness of the hydrophobic deposition layer was about 110 Å.

Comparative Example 3

A metal mesh foil was prepared in the same manner as in Example 1 by forming a hydrophobic deposition layer on the copper mesh foil except that 20 μl of trichloro(1H,1H,2H,2H-perfluorooctyl)silane was used in Example 1. In this case, a thickness of the hydrophobic deposition layer was about 200 Å.

Comparative Example 4

A metal mesh foil was prepared in the same manner as in Example 1 by forming a hydrophobic deposition layer on the copper mesh foil except that 0.2 μl of trichloro(1H,1H,2H,2H-perfluorooctyl)silane was used in Example 1. In this case, a thickness of the hydrophobic deposition layer was between 0.5 Å and 1 Å.

Comparative Example 5

A metal mesh foil was prepared in the same manner as in Example 1 by forming a hydrophobic deposition layer on the copper mesh foil except that 0.1 μl of trichloro(1H,1H,2H,2H-perfluorooctyl)silane was used in Example 1. In this case, a thickness of the hydrophobic deposition layer was between 0.1 Å and 0.5 Å.

Experimental Example 1: Surface Property Evaluation

Contact angles were measured for the metal mesh foils for a current collector of a lithium secondary battery of Examples 1 to 4 and Comparative Examples 1 to 5 by using a contact angle meter (Phoenix300 manufactured by SEO Co. Ltd.), and sheet resistances were measured with a 4-point probe sheet resistance measurement system. For the contact angle measurement, after a sample was put on a flat substrate and a small amount of water was dropped by using a syringe cylinder, a camera lens was disposed in a direction perpendicular to a surface of the substrate (side of the substrate) and a method of measuring a contact angle, which is formed between a surface of the sample and a droplet, was performed. The results thereof are presented in Table 1 below.

TABLE 1

| | Water contact angle (°) | Sheet resistance ($m\Omega \cdot cm^2$) |
|---|---|---|
| Example 1 | 110 | 1.1 |
| Example 2 | 105 | 1.05 |
| Example 3 | 110 | 1.13 |
| Example 4 | 125 | 1.22 |
| Comparative Example 1 | 60 | 1 |
| Comparative Example 2 | 130 | 1.25 |
| Comparative Example 3 | 150 | 1.4 |
| Comparative Example 4 | 70 | 1 |
| Comparative Example 5 | 65 | 1 |

Referring to Table 1, since the metal mesh foils of Examples 1 to 4 had a water contact angle of 105° to 125°, it may be confirmed that the surfaces thereof were hydrophobically modified when compared with a water contact angle of 60° of Comparative Example 1 in which the hydrophobic deposition layer was not formed.

Since the metal mesh foils of Comparative Examples 2 and 3 respectively had a water contact angle of 130° and 150°, it may be confirmed that the highest degree of hydrophobic surface modification was obtained, but it may also confirmed that the sheet resistance was proportionally increased as the thickness of the hydrophobic deposition layer was increased.

With respect to Comparative Examples 4 and 5, since the thickness of the hydrophobic deposition layer did not reach an appropriate thickness, water contact angles were only respectively 65° and 70°, and it may be confirmed that hydrophobic surface modification was not properly obtained.

Experimental Example 2: Evaluation of Affinity with Slurry

A negative electrode slurry was prepared by mixing 86 wt % of graphite as a negative electrode active material, 1 wt % of Denka black (conductive agent), 2 wt % of SBR (binder), and 1 wt % of CMC (thickener) with NMP as a solvent. The prepared negative electrode active material slurry was respectively coated on the metal mesh foils for a current collector of a lithium secondary battery of Example 1 and Comparative Examples 1, 3, and 4 to form a 100 μm thick active material layer, and the active material layer was then dried.

A thickness of each active material layer formed was measured and the results thereof are presented in Table 2.

TABLE 2

| | Thickness of the active material layer formed (excluding copper mesh) |
|---|---|
| Example 1 | 100 μm |
| Comparative Example 1 | 10 μm |
| Comparative Example 3 | 100 μm |
| Comparative Example 4 | 15 μm |

Referring to Table 2, with respect to the metal mesh foils of Example 1 and Comparative Example 3 respectively having a water contact angle of 110° and 150° due to sufficient hydrophobic modification of the surfaces, since there was no flowing down of the slurry between the meshes, a desired thickness of the active material layer of 100 μm may be obtained. However, with respect to the metal mesh foils of Comparative Examples 1 and 4 in which the surfaces were not sufficiently modified to be hydrophobic, since a phenomenon occurred in which the slurry flowed down between the meshes, it may be confirmed that thicknesses of the active material layers were only respectively 10 μm and 15 μm and the coating of the negative active material slurry was not performed as intended.

Example 5

Preparation of Lithium Secondary Battery

A negative electrode slurry was prepared by mixing 98 wt % of artificial graphite as a negative electrode active material, 1 wt % of SBR (binder), and 1 wt % of CMC (thickener) with NMP as a solvent. The prepared negative electrode active material slurry was coated on the metal mesh foil for a current collector of a lithium secondary battery of Example 1 to form a 100 μm thick active material layer, and the active material layer was then dried and roll-pressed to prepare a negative electrode.

A separator formed of three layers of polypropylene/polyethylene/polypropylene (PP/PE/PP) was disposed between the negative electrode thus prepared and Li metal as a positive electrode, and a non-aqueous electrolyte solution, which was prepared by dissolving a LiPF$_6$ electrolyte having a concentration of 1 M in a mixed solvent composed of ethylene carbonate (EC), diethyl carbonate (DEC), and ethylmethyl carbonate (EMC) (volume ratio of EC:DEC:EMC=4:3:3), was then injected thereinto to prepare a coin-type half-cell.

Example 6

Preparation of Lithium Secondary Battery

A negative electrode was prepared in the same manner as in Example 5 except that the metal mesh foil for a current collector of a lithium secondary battery of Comparative Example 1 was used as the negative electrode collector in Example 5 instead of the metal mesh foil for a current collector of a lithium secondary battery of Example 1.

However, in the preparation of the negative electrode, in a case in which the metal mesh foil for a current collector of a lithium secondary battery of Comparative Example 1 was used, since the phenomenon occurred in which the slurry flowed down between the meshes, a negative electrode layer was not formed properly. Accordingly, the preparation of the negative electrode was not possible.

Example 7

Preparation of Lithium Secondary Battery

A negative electrode was prepared in the same manner as in Example 5 except that a 50 μm thick copper foil having a smooth surface was used as the negative electrode collector in Example 5 instead of the metal mesh foil for a current collector of a lithium secondary battery of Example 1, and a coin-type half-cell was prepared.

Experimental Example 3: Measurement of Discharge Capacity and Change in Negative Electrode Thickness A charge and discharge test, in which charge and discharge current density was 0.2 C, a charge end voltage was 0.05 V(Li/Li$^+$), and a discharge end voltage was 1.5 V(Li/Li$^+$), was performed twice on each coin-type half-cell of Example 5 and Comparative Example 7. Subsequently, after a discharge capacity was measured at a charge current density of 0.2 C and a discharge current density of 2C, a capacity ratio was obtained by dividing the discharge capacity by a second discharge capacity and it was then considered as 2C discharge capacity (%). The results thereof are presented in Table 3 below.

A charge and discharge test under the same conditions as above was repeated up to 15 times, the battery was fully charged at a charge current density of 0.2 C, and the battery was then disassembled to measure a thickness of the negative electrode.

Thicknesses of the negative electrodes prepared in Example 5 and Comparative Example 7 were compared with thicknesses of the negative electrodes after the 15$^{th}$ charge and discharge test, and negative electrode thickness increase rates after the 15$^{th}$ charge and discharge test are also presented in Table 3 below.

TABLE 3

| | 2 C discharge capacity (%) | Negative electrode thickness increase rate after the 15$^{th}$ charge and discharge (%) |
|---|---|---|
| Example 5 | 99% | 23% |
| Comparative Example 6 | — (impossible to prepare negative electrode) | — (impossible to prepare negative electrode) |
| Comparative Example 7 | 97% | 33% |

From the measurement of the 2C discharge capacity, it may be confirmed that, in a case in which the negative electrode is prepared by using the metal mesh foil of Example 1 (Example 5), a discharge capacity of the coin-type half-cell using the above negative electrode was better than that of a case in which the negative electrode was prepared by using a typical copper foil (Example 7). Accordingly, it may be confirmed that, since the metal mesh foil having a hydrophobic deposition layer formed on the surface thereof was more effectively coated with the negative electrode active material slurry, output characteristics of the electrode was improved in comparison to those of the case in which the typical copper foil was used.

That the metal mesh foil having a hydrophobic deposition layer formed on the surface thereof showed better adhesion of the negative electrode active material slurry than the typical copper foil may be confirmed by the result that the thickness increase rate of the negative electrode prepared in Example 5 was lower than the thickness increase rate of the negative electrode prepared in Example 7 after the $15^{th}$ charge and discharge.

Also, it may be confirmed that the limitation, in which the preparation of the negative electrode was difficult due to the fact that the coating of the negative electrode was not smoothly performed due to the flowing down of the negative electrode active material slurry when the surface of the metal mesh foil was coated with the negative electrode active material slurry (Comparative Example 6), may be addressed by forming a hydrophobic deposition layer on the surface of the metal mesh foil.

The invention claimed is:

1. An electrode for a lithium secondary battery, comprising:
   a metal mesh foil,
   a hydrophobic deposition layer consisting of a hydrophobic material, wherein the hydrophobic material is an organic silane-based compound, the hydrophobic deposition layer in direct physical contact with a surface the metal mesh foil, wherein the hydrophobic deposition layer has a thickness of 1 Å to 100 Å; and
   an electrode active layer separated from the metal mesh foil by the thickness of the hydrophobic deposition layer, the electrode active layer comprising an electrode active material, a conductive agent, and a binder, the electrode active layer in direct physical contact with a surface of the hydrophobic deposition layer.

2. The electrode of claim 1, wherein the organic silane-based compound is at least one selected from the group consisting of triethoxy vinylsilane, dimethyl ethoxy vinylsilane, 3-mercaptopropyl trimethoxysilane, trimethoxy fluorosilane, and trichloro(1H, 1H,2H,2H-perfluorooctyl)silane.

3. The electrode of claim 1, wherein the hydrophobic material is trichloro(1H,1H,2H,2H-perfluorooctyl)silane.

4. The electrode of claim 1, wherein the hydrophobic deposition layer is formed by chemical vapor deposition (CVD).

5. The electrode of claim 1, wherein the hydrophobic deposition layer has a water contact angle of 80° to 130°.

6. The electrode of claim 1, wherein the metal mesh foil and the hydrophobic deposition layer has a resistance value of 105% to 130% compared to the metal mesh foil alone.

7. The electrode of claim 1, wherein the metal mesh foil has a resistance value of 0.9 mΩ·cm$^2$ to 1.3 mΩ·cm$^2$.

8. The electrode of claim 1, wherein the electrode is a negative electrode.

9. The electrode of claim 1, wherein the metal mesh foil is a mesh foil of copper, gold, stainless steel, aluminum, nickel, titanium, fired carbon; copper or stainless steel surface-treated with carbon, nickel, titanium, or silver; or an aluminum-cadmium alloy.

10. The electrode of claim 1, wherein the metal mesh foil is a copper mesh foil.

11. The electrode of claim 1, wherein the metal mesh foil has a thickness of 3 μm to 500 μm.

12. The electrode of claim 1, wherein the electrode active material is a negative electrode active material.

13. A lithium secondary battery comprising the electrode of claim 12.

14. The electrode of claim 1, wherein the conductive agent is selected from the group consisting of graphite, carbon black, carbon fibers, metal fibers, carbon nanotubes, metal powder, conductive metal whiskers, and conductive metal oxide.

* * * * *